(12) United States Patent
Kabalnov

(10) Patent No.: US 6,372,029 B1
(45) Date of Patent: Apr. 16, 2002

(54) INK JET INK COMPOSITIONS HAVING GOOD FREEZE-THAW STABILITY

(75) Inventor: Alexey S Kabalnov, Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/495,424

(22) Filed: Jan. 31, 2000

(51) Int. Cl.[7] ............................................. C09D 11/00
(52) U.S. Cl. ............................ 106/31.13; 106/31.27; 106/31.6; 106/31.58; 106/31.86; 106/31.49; 106/31.78
(58) Field of Search .................. 106/31.13, 31.27, 106/31.6, 31.58, 31.86, 31.49, 31.78, 31.87

(56) References Cited

U.S. PATENT DOCUMENTS

| | | | |
|---|---|---|---|
| 5,540,765 A | 7/1996 | Gundlach et al. | 106/31.43 |
| 5,679,143 A | 10/1997 | Looman | 106/31.43 |
| 5,738,716 A | 4/1998 | Santilli et al. | 106/31.77 |
| 5,766,325 A * | 6/1998 | Gundlach et al. | 106/31.43 |
| 5,769,929 A * | 6/1998 | Gundlach et al. | 106/31.27 |
| 5,772,743 A | 6/1998 | Gundlach et al. | 106/31.27 |
| 5,925,177 A | 7/1999 | Carreira et al. | 106/31.43 |
| 5,954,866 A * | 9/1999 | Ohta et al. | 106/31.89 |
| 5,969,003 A | 10/1999 | Foucher et al. | 523/160 |
| 6,001,899 A * | 12/1999 | Gundlach et al. | 523/160 |
| 6,004,389 A | 12/1999 | Yatake | 106/31.86 |

OTHER PUBLICATIONS

McDonald & McDonald, Liposome Technology, vol. 1, pp. 209–227, 1993,no month available.
CRC Press, Inc.; Strauss et al., Biochimica et Biophysica Acta 858 (1986) 169–180,no month available.
Elsevier Science Publishers; Higgins et al., J. Pharm. Pharmacol.1986, 38:259–263,no month available.
Saito et al., Journal of Colloid and Interface Science 219: (1) 129–134, Nov. 1, 1999.
Bermel and Burger (D. Bermel and D.E. Burger, "Particle size effects in pigmented ink jet inks", J. Imaging Sc., Tech., V. 43 (1999) 320–324, no month available.
Spinelli H.J., "Polymeric dispersants in ink jet technology", Advanced Materials, 10: (15) 1215–+, Oct. 20, 1998.

* cited by examiner

*Primary Examiner*—C. Melissa Koslow
*Assistant Examiner*—Veronica F. Faison

(57) ABSTRACT

The present invention is directed to using cryoprotectants to improve freeze-thaw stability in an ink-jet ink composition.

8 Claims, 2 Drawing Sheets

INK JET INK COMPOSITIONS HAVING GOOD FREEZE-THAW STABILITY

FIELD OF INVENTION

The present invention relates to inkjet ink compositions, which have good freeze-thaw stability as a result of the presence of a cryoprotectant component in the ink composition.

BACKGROUND OF THE INVENTION

It is well known that many water-based particulate systems lack cryostability, i.e. show instability to a freeze-thaw cycle or cycles. Many dairy products, pharmaceutical emulsions, and water-based paints separate into two layers or show particle aggregation after a single freeze-thaw cycle. The reason for the instability is thought to be the formation of ice crystals, which tend to push emulsion or suspension particles together. For "hard" suspension particles, such as pigments in paints, this results in the formation of irreversible clumps, so that increasing temperature does not resuspend them. In the gravity field, these clumps quickly settle. For "soft" particles, such as emulsions and vesicles (liposomes), ice crystals can cause irreversible coarsening of the system because of the liquid film breakage.

Suspensions of particles in the form of lipid bilayer vesicles or liposomes, as well as oil-in-water emulsions, in an aqueous vehicle have been studied in the pharmaceutical and/or biochemical context. Freeze-thaw experiments have shown that the presence of glycerol, dimethylsulfoxide (DMSO), certain sugars and certain amino acids confer a cryoprotectant effect on the lipid layers in the suspensions. See McDonald & McDonald, *Liposome Technology*, Vol. 1, pp. 209–227, 1993, CRC Press, Inc.; Strauss et al., *Biochimica et Biophysica Acta* 858 (1986) 169–180, Elsevier Science Publishers; Higgins et al., *J. Pharm. Pharmacol.* 1986, 38:259–263; Saito et al., *Journal of Colloid and Interface Science* 219: (1)129–134, Nov. 1, 1999.

Spinelli disclosed treating the problem of freeze-thaw instability in aqueous ink-jet inks with a polymer binder additive. See Spinelli in *Adv. Mater.* 1998, vol. 10, pp. 1215–1218. Spinelli also disclosed different acrylic block copolymers for use in pigmented inks for the purpose improving freeze-thaw instability in the inks. It appears that none of the additives disclosed by Spinelli effect more than limited improvement in cryostability.

Previously, polyols, such as glycerol, as well as sugars and/or amino acids have been used in aqueous ink-jet inks but have never been specifically used with the purpose of affecting the cryostability of the ink particulates.

Thus, Bermel and Burger (D. Bermel and D.E. Burger, "Particle size effects in pigmented ink jet inks", *J. Imaging Sc., Tech.*, V. 43 (1999) 320–324 disclosed several color pigmented inks in which the ink vehicle contains 7–12% glycerol. They specifically studied the freeze-thaw stability of the inks and found acceptable results for some dispersions. There was no discussion in the article of the role of glycerol (that is, the effect was not attributed to the presence of glycerol). The main objective was to show the particle size effect on the freeze-thaw stability.

Looman disclosed that acids containing a basic functional group help to alleviate bleed in pigmented ink jet inks (U.S. Pat. No. 5,679,143 assigned to HP). Specifically, Looman showed that when inks have amino acid additives such as beta-alanine, 4-aminobutyric acid, DL-alanine, glycine, threonine, sarcosine, diiodo-L-tyrosine, L-glutamic acid, L-histidine, hydroxy-L-proline, DL-isoleucine, DL-deucine, L-lysine, DL-methionine, DL-phenylalanine, L-proline, DL-serine, L-tryptophan, L-tyrosine, 6-aminocaproic acid, and DL-valine, that bleed control and pH adjustment are achieved. No mention is made of the effect of amino acids on freeze-thaw instability.

Gundlach et al. disclosed that the use of betaine zwitterionic base compositions as ink additives (U.S. Pat. No. 5,540,765, assigned to Xerox). In a related disclosure Gundlach et al. disclosed ink compositions with vesicles containing betaine (U.S. Pat. No. 5,772,743, assigned to Xerox). No connection was made between these compositions and freeze-thaw instability in either of these disclosures.

Yatake disclosed sugars as additives in ink-jet inks (U.S. Pat. No. 6,004,389, assigned to Seiko Epson). The disclosed benefits of these additives have nothing to do with freeze-thaw instability. Rather, it is taught that the addition of saccharide can effectively prevent clogging of the nozzle in the ink jet recording head.

SUMMARY OF THE INVENTION

The present invention relates to a method of using a cryoprotectant to improve freeze-thaw ability in an ink-jet ink composition comprising adding cryoprotectant to an ink-jet ink composition.

DETAILED DESCRIPTION OF THE INVENTION

Figure 1A:
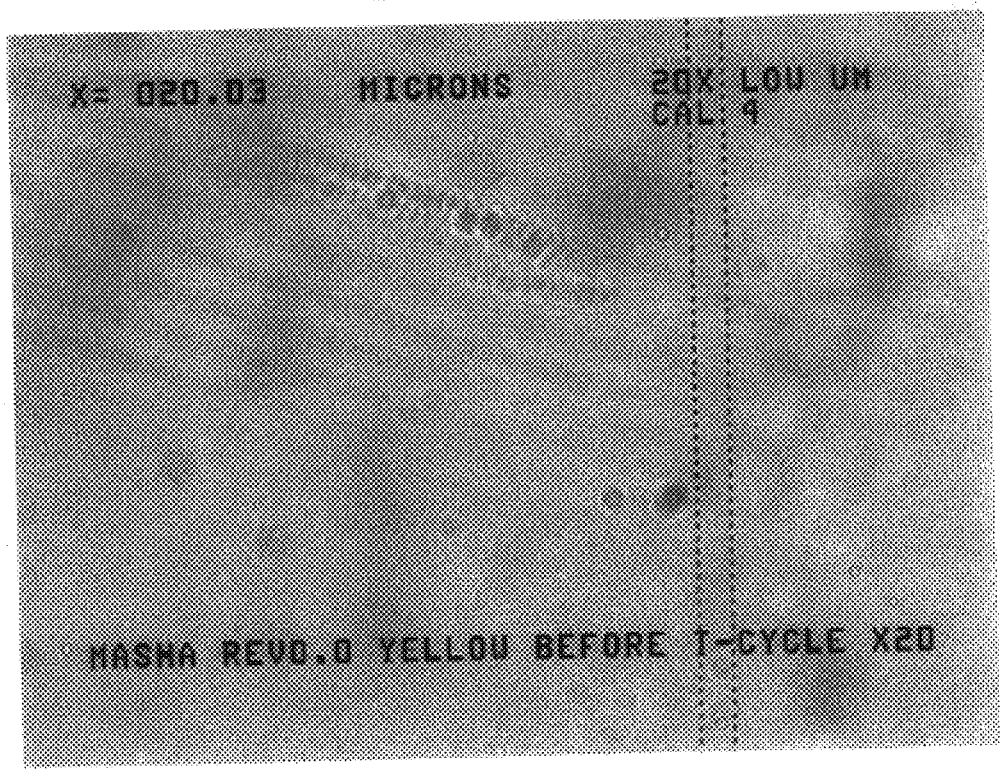
FIGS. 1A and 1B are comparative photographs, which show by microscopic examination the absence and presence of large vesicle particulates in Ink Set 0.0 samples before and after thermal cycling.

Freeze-thaw instability is a potential concern for inkjet inks, both from the standpoint of the bulk ink shipment, and from the standpoint of reliability of already filled pens that occasionally can be frozen by the user. This instability concern has been addressed with the "T-cycle test", in which the inks are repeatedly cooled down and heated up between −40 and 70° C. up to a total of four freeze-thaw cycles. As a criterion of T-cycle instability, the viscosity and density of the sample before and after the T-cycle are analyzed. After the T-cycle, the sample is separated into the top and bottom portions. Then the samples are characterized by various techniques, such as viscometry and densitometry. Another method of characterizing the T-cycle instability is to measure the concentration of large particles before and after the T-cycle.

In general, particulates that are greater than 0.5 $\mu$m are highly undesirable for ink-jet, because they tend to settle in the firing chamber. Moreover, very large aggregates greater than 5 μm can potentially clog the nozzles of the printhead. Therefore, it is important for the concentration of the large particles to remain small after the T-cycle.

Experiments have shown that many commercial black inks used in thermal inkjet printing are not stable to T-cycle. For example, the black ink used in an HP 2000c inkjet printer has a viscosity spread between 2.4 (top of the vial) and 4.3 cP (bottom), and a density spread between 1.030 (top) and 1.055 g/ml (bottom). This indicates that the ink performance after T-cycle will be different because of the overall change in viscosity and density. More importantly, it shows that the inks form large carbon black aggregates, which are a potential concern for the pen reliability.

A previous treatment of this problem was to add a polymer binder to pigmented inks, as described, for example, in the Spinelli paper mentioned above. Some binders were known to contribute a better improvement in T-cycle stability of dispersions than others. However the binder alone does not provide enough stability to the inks and the problem is not solved.

The problem of instability of aqueous systems to freezing is known in biology and pharmaceuticals, where it is solved by adding cryoprotectants to the systems. The role of cryoprotectants is not very clear. One possible explanation for their action is a vitrification effect at low temperatures. On freezing, the formation of glasses, as opposed to crystals, is known to be less damaging to the stability of the aqueous system and normally preserves the original structure of the system (see the McDonald & McDonald paper mentioned above).

A non-exclusive list of some cryoprotectants used in biology is shown below:

Glucose, sucrose, maltose, trehalose, sorbitol, mannitol, other mono and polysaccharides and their derivatives, glycerol, alanine, β-alanine, betaine, dimethylsulfoxide, and polyvinylpyrrolidone.

The typical required range of concentrations of these additives in the formulation to achieve the cryoprotective effect is 1–30%. Even though glycerol, betaine, β-alanine and some sugars are used as excipients in inkjet, they have not been used for their cryoprotective action.

The present invention relates to a method of using cryoprotectants to improve freeze-thaw stability in an ink-jet ink composition comprising adding cryoprotectant to an ink-jet ink composition. In a preferred embodiment, the at least one cryoprotectant is from 1 to 30% by weight of the ink-jet ink composition. In still another preferred embodiment, the at least one cryoprotectant is selected from the group consisting of monosaccharides, polysaccharides, glycerol, alanine, glycinebetaine, dimethylsulfoxide, polyvinylpyrrolidone and combinations and derivatives thereof and in a yet more preferred embodiment, the monosaccharides and polysaccharides are selected from the group consisting of glucose, sucrose, maltose, trehalose, sorbitol and mannitol. In yet another preferred embodiment, the ink-jet ink composition comprises at least one of colorant particles, emulsion drops, polymer latexes and vesicles in an aqueous vehicle.

In a more preferred embodiment, the amount of cryoprotectant added to the ink-jet ink composition is sufficient that the composition remains substantially free of visible sediment after at least one freeze-thaw cycle wherein the composition is heated to a high temperature of at highest 70° C. and cooled to a low temperature of at lowest –40°C. In a most preferred embodiment, there are at most four freeze-thaw cycles performed on the composition.

In another more preferred embodiment, the amount of cryoprotectant added to the ink-jet ink composition is sufficient so that the concentration of particles greater than 0.5 μm in the composition does not substantially increase after at least one freeze-thaw cycle wherein the composition is heated to a high temperature of at highest 70°C. and cooled to a low temperature of at lowest –40° C. In a most preferred embodiment, there are at most four freeze-thaw cycles are performed on the ink-jet ink composition sample.

EXAMPLES

Example 1

Ink Vesicle Compositions 1a, 1b, 2a, 2b, 3a, 3b, 4a, 4b, 5a, 5b, 6a, 6b, were made according to the formulations given below. They were prepared by sonication using a Sonication XL (West Systems) in an ice bath. Resulting systems were visually transparent.

| Component | Composition 1a, Wt percent | Composition 1b, Wt percent |
|---|---|---|
| Diethylene Glycol (Aldrich) | 4 | 4 |
| 2-Pyrrolidone (Aldrich) | 4 | 4 |
| Glycerol (Aldrich) | 10 | 0 |
| trimethylolpropane | 0 | 10 |
| EDTA (Aldrich) | 0.3 | 0.3 |
| Trizma base (Sigma) | 0.2 | 0.2 |
| Proxel GXL (ICI) | 0.2 | 0.2 |
| Soya bean (plant) phosphatidylcholine, 20% PC (Avanti lipids, Alabaster, AL) | 3 | 3 |
| Water | balance | balance |

| Component | Composition 2a, Wt percent | Composition 2b, Wt percent |
|---|---|---|
| Diethylene Glycol (Aldrich) | 4 | 4 |
| 2-Pyrrolidone (Aldrich) | 4 | 4 |
| Glycerol (Aldrich) | 10 | 0 |
| trimethylolpropane | 0 | 10 |
| EDTA (Aldrich) | 0.3 | 0.3 |
| Trizma base (Sigma) | 0.2 | 0.2 |
| Proxel GXL (ICI) | 0.2 | 0.2 |
| Soya bean (plant) phosphatidylcholine, 45% PC (Avanti lipids, Alabaster, AL) | 3 | 3 |
| Water | balance | balance |

| Component | Composition 3a, Wt percent | Composition 3b, Wt percent |
|---|---|---|
| Diethylene Glycol (Aldrich) | 4 | 4 |
| 2-Pyrrolidone (Aldrich) | 4 | 4 |
| Glycerol (Aldrich) | 10 | 0 |
| trimethylolpropane | 0 | 10 |
| EDTA (Aldrich) | 0.3 | 0.3 |

| Component | Composition 3a, Wt percent | Composition 3b, Wt percent |
|---|---|---|
| Trizma base (Sigma) | 0.2 | 0.2 |
| Proxel GXL (ICI) | 0.2 | 0.2 |
| Soya bean (plant) phosphatidylcholine, 95% PC (Avanti lipids, Alabaster, AL) | 3 | 3 |
| Water | balance | balance |

| Component | Composition 4a, Wt percent | Composition 4b, Wt percent |
|---|---|---|
| Diethylene Glycol (Aldrich) | 4 | 4 |
| 2-Pyrrolidone (Aldrich) | 4 | 4 |
| Glycerol (Aldrich) | 10 | 0 |
| trimethylolpropane | 0 | 10 |
| EDTA (Aldrich) | 0.3 | 0.3 |
| Trizma base (Sigma) | 0.2 | 0.2 |
| Proxel GXL (ICI) | 0.2 | 0.2 |
| Egg yolk phosphatidylcholine, 60% PC (Avanti lipids, Alabaster, AL) | 3 | 3 |
| Water | balance | balance |

| Component | Composition 5a, Wt percent | Composition 5b, Wt percent |
|---|---|---|
| Diethylene Glycol (Aldrich) | 4 | 4 |
| 2-Pyrrolidone (Aldrich) | 4 | 4 |
| Glycerol (Aldrich) | 10 | 0 |
| Glucose (Aldrich) | 10 | 0 |
| trimethylolpropane | 0 | 10 |
| EDTA (Aldrich) | 0.3 | 0.3 |
| Trizma base (Sigma) | 0.2 | 0.2 |
| Proxel GXL (ICI) | 0.2 | 0.2 |
| Egg yolk phosphatidylcholine, 60% PC (Avanti lipids, Alabaster, AL) | 3 | 3 |
| Water | balance | balance |

| Component | Composition 6a, Wt percent | Composition 6b, Wt percent |
|---|---|---|
| 2-Pyrrolidone (Aldrich) | 7.5 | 7.5 |
| Betaine (Aldrich) | 2.5 | 0 |
| 1,5 pentanediol (Aldrich) | 8 | 8 |
| trimethylolpropane | 7.5 | 7.5 |
| EDTA (Aldrich) | 0.3 | 0.3 |
| Trizma base (Sigma) | 0.2 | 0.2 |
| Proxel GXL (ICI) | 0.2 | 0.2 |
| Egg yolk phosphatidylcholine, 60% PC (Avanti lipids, Alabaster, AL) | 3 | 3 |
| Water | balance | balance |

Example 2

Results of Freeze-thaw Testing

The instability of the ink compositions of Example 1 to freeze-thaw cycle was tested with four freeze-thaw cycles between −40 and 70°C. within 36 hours. After the test, the samples were visually inspected. For some samples, the count of large particles (larger than 0.5 $\mu$m) was determined using a 780 A Accusizer (Particle Sizing Systems, Santa Barbara, Ca). The method is based on the single particle sensing technique. The sample is strongly diluted by water, after which it is pumped through a small chamber, where the light scattering signal from each particle is detected as an electrical impulse. The measuring cell is set up in such a way that the signal is proportional to the radius of the particle. Fifty $\mu$L of ink was introduced into the measuring cell and automatically diluted by the instrument to the required level. After one minute of mixing, the measurement was made. The results are given below.

| Sample | Appearance after testing | Count of >0.5 $\mu$m particles before testing, counts/ml | Count of >0.5 $\mu$m particles after testing, counts/ml |
|---|---|---|---|
| 1a | Clear, no sediment | 1.71 × 10$^6$ | 2.19 × 10$^6$ |
| 1b | Turbid, some sediment | | |
| 2a | Clear, no sediment | 4.29 × 10$^6$ | 2.25 × 10$^6$ |
| 2b | Turbid, some sediment | | |
| 3a | Clear, no sediment | 6.62 × 10$^6$ | 6.95 × 10$^6$ |
| 3b | Turbid, some sediment | | |
| 4a | Clear, no sediment | 1.18 × 10$^8$ | 2.25 × 10$^8$ |
| 4b | Turbid, some sediment | | |
| 5a | Clear, no sediment | 5.08 × 10$^6$ | 2.53 × 10$^5$ |
| 5b | Turbid, some sediment | | |
| 6a | Clear, no sediment | | |
| 6b | Turbid, some sediment | | |

The above results show that the samples containing cryoprotectants ("a" samples) are stable towards several freeze-thaw cycles, while the respective controls, marked as "b", are not. After the test, only a moderate change in the number of large particles is seen in the "a" samples. On the other hand, without cryoprotectants, visual precipitation of large clumps is observed.

Example 3

Freeze-thaw Stability of Vesicle Inks

The composition of two vesicle-containing ink compositions are listed below. Ink preparation included the following stages:

(i) Ink concentrate was prepared for each color, containing co-solvents, dyes, buffer and an antimicrobe agent (Proxel GXL).

(ii) 15 g egg yolk lecithin was added to the ink concentrate and pre-mixed with a 25% Ultratorrax (Janke & Kunkel, IKA Labortechnik) for 10 minutes. The concentrates were high-pressure homogenized with an APV Rannie homogenizer at 14,000 psi for six passes. They were then cooled by a coil placed in a water bath. After homogenization, the inks were no longer turbid, but slightly opalescent.

(iii) The solution of polymeric binder and surfactant was added to the ink compositions and there was a final mixing. As a binder, an acrylic polymer manufactured by duPont de Nemours was used. As a surfactant, Fluorad FC-99 (3M) fluorinated surfactant was added. After this, the inks were rolled for half an hour after which they were ready to use.

The compositions of each of Ink Set 0.0 and Ink Set 0.7 are given below. For the dyes, the concentrations are shown as optical densities at 1:10,000 dilution.

Composition of Ink Set 0.0

| Cyan | | Magenta | | Yellow | |
|---|---|---|---|---|---|
| 1,5 pentane diol (Tricon Colors, Inc., Elmwood Park, NJ) | 6.8% | 1,5 pentanediol (Tricon Colors, Inc, Elmwood Park, NJ) | 6.8% | Diethylene glycol (Aldrich) | 3.4% |
| trimethylolpropane (Aldrich) | 6.4% | trimethylolpropane (Aldrich) | 6.4% | trimethylolpropane (Aldrich) | 6.8% |
| 2-Pyrrolidone Aldrich) | 6.4% | 2-Pyrrolidone (Aldrich) | 6.4% | 2-Pyrrolidone (Aldrich) | 3.4% |
| Trizma base (Sigma) | 0.17% | Trizma base (Sigma) | 0.17% | 2-N-morpholino-ethane-sulfonic acid (MES) (Sigma) | 0.17% |
| Proxel GXL (ICI America) | 0.17% | Proxel GXL (ICI America) | 0.17% | Proxel GXL (ICI America) | 0.17% |
| Fluorad FC-99 (3M) | 0.85% | Fluorad FC-99 (3M) | 0.85% | Fluorad FC-99 (3M) | 0.85% |
| Egg yolk lecithin (60% Sigma) | 2.6% | Egg yolk lecithin 60% Sigma) | 2.6% | Egg yolk lecithin 60% Sigma) | 2.6% |
| Acrylic polymer binder (duPont de Nemours, Wilmington, DE) | 1.7% | Acrylic polymer binder (duPont de Nemours, Wilmington, DE) | 1.7% | Acrylic polymer binder (duPont de Nemours, Wilmington, DE) | 1.7% |
| TMA direct blue 199 Zeneca Specialist Colours, New Castle, DE) | D = 0.14 (622 nm) | Reactive red 180 (D at 1:10,000) (Clariant Corp., Charlotte, NC) | D = 0.14 (542 nm) | TMA Acid Yellow 23 (D at 1:10,000) (Hilton Davis Co., Cincinnati, OH) | D = 0.20 (428 nm) |
| Na Acid Blue 9 (Warner Jenkinson Co., Inc., St. Louis, MO) (D at 1:100 | D = 0.26 (630 nm) | Li Acid Red 52 (D at 1:10,000) (Tricon Colors, Inc., Elmwood Park, NJ) | D = 0.22 (566 nm) | | |
| water | balance | water | balance | water | balance |

Composition of Ink Set 0.7

| Cyan | | Magenta | | Yellow | |
|---|---|---|---|---|---|
| Trizma base (Sigma) | 0.17% | Trizma base (Sigma) | 0.17% | 2-N-morpholino-ethane-sulfonic acid (MES) (Sigma) | 0.17% |
| Proxel GXL ICI America) | 0.17% | Proxel GXL (ICI America) | 0.17% | Proxel GXL (ICI America) | 0.17% |
| Fluorad FC-99 (3M) | 0.85% | Fluorad FC-99 (3M) | 0.85% | Fluorad FC-99 (3M) | 0.85% |
| Egg yolk lecithin (60% Sigma) | 2.6% | Egg yolk lecithin (60% Sigma) | 2.6% | Egg yolk lecithin (60% Sigma) | 2.6% |
| Acrylic polymer binder (duPont de Nemours, Wilmington, DE) | 1.7% | Acrylic polymer binder (duPont de Nemours, Wilmington, DE) | 1.7% | Acrylic polymer binder (duPont de Nemours, Wilmington, DE) | 1.7% |
| TMA direct blue 199 (Zeneca Specialist Colours, New Castle, DE) | D = 0.14 (622 nm) | Reactive red 180(D at 1:10,000) (Clariant Corp., Charlotte, NC) | D = 0.14 (542 nm) | TMA Acid Yellow 23 (D at 1:10,000) (Hilton Davis Co., Cincinnati, OH) | D = 0.20 (428 nm) |
| Na Acid Blue 9 (Warner Jenkinson Co., Inc., St. Louis, MO) (D at 1:100 | D = 0.26 (630 nm) | Li Acid (D at 1:10,000) (Tricon Colors, Inc., Elmwood Park, NJ) | D = 0.22 (566 nm) | | |
| water | balance | water | balance | water | balance |

Example 4

Comparison of Freeze-thaw Stabilities of Ink Set 0.0 and Ink Set 0.7

Ink Set 0.0 does not contain any cryoprotective agents in its solvent system. Accordingly, its freeze-thaw stability is poor. After the thermal cycling described above, phospholipid precipitates out of the inks and the inks acquire a turbid appearance, most clearly seen in the yellow color.

Figure 1B:
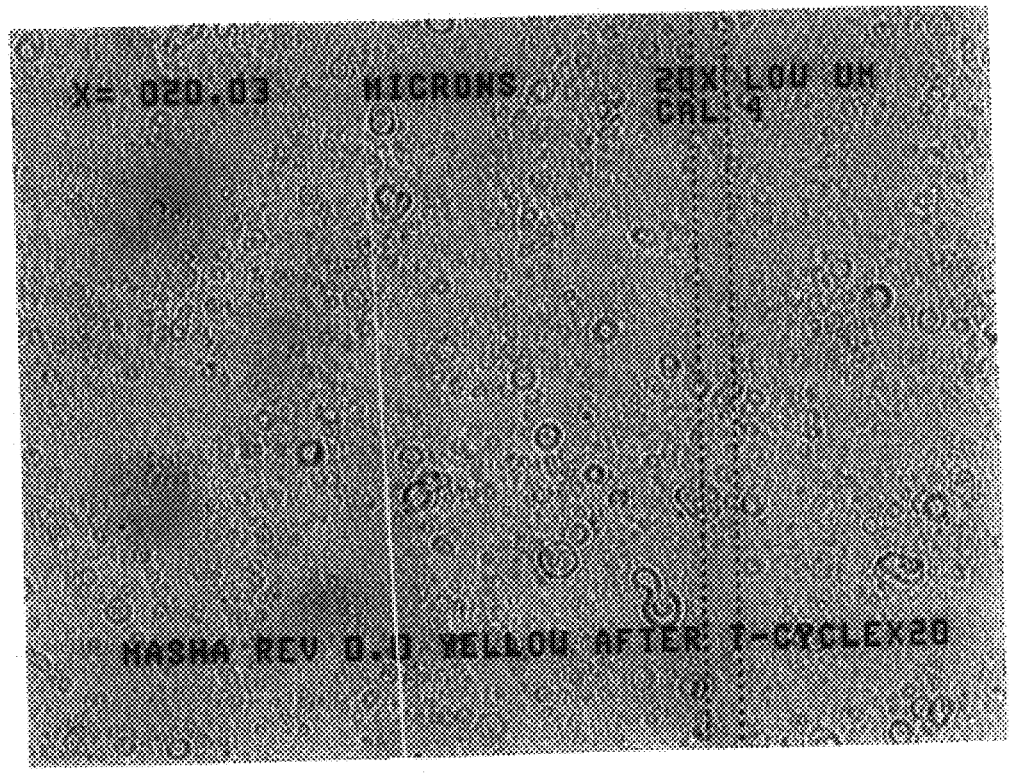

FIGS. 1A and 1B are comparative photographs that show by microscopic examination the absence and presence of precipitates in ink samples before and after thermal cycling.

Figure 2A:
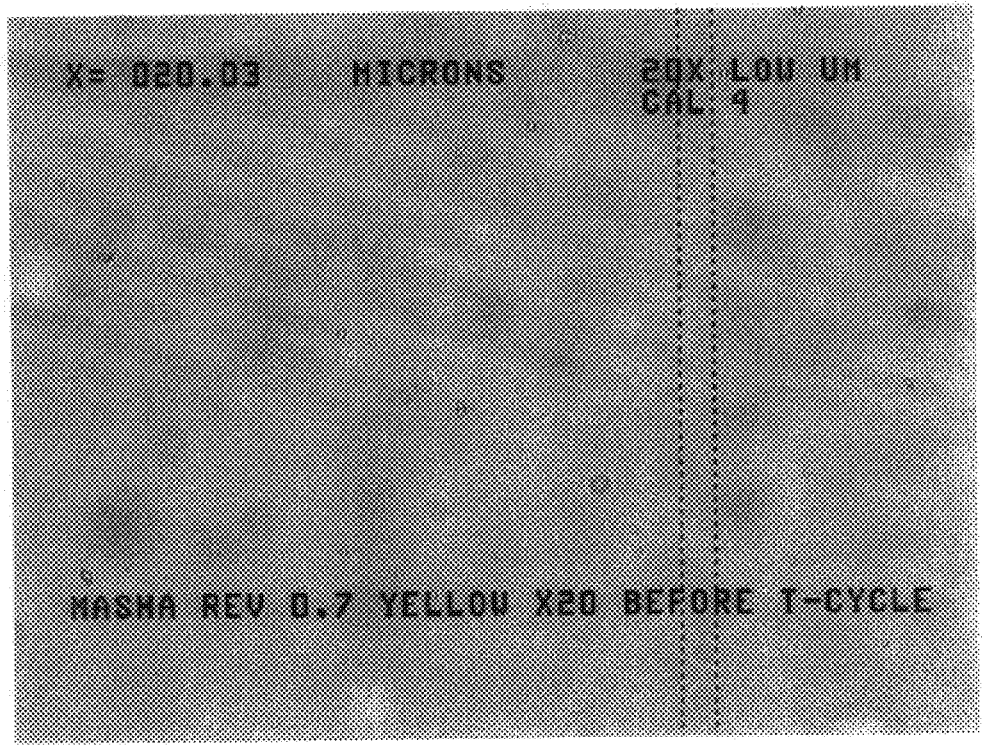
FIGS. 2A and 2B are comparative photographs that show by microscopic examination that re is no increase in the number of large vesicle particulates in the Ink Set 0.7 samples after thermal cycling.
Figure 2B:
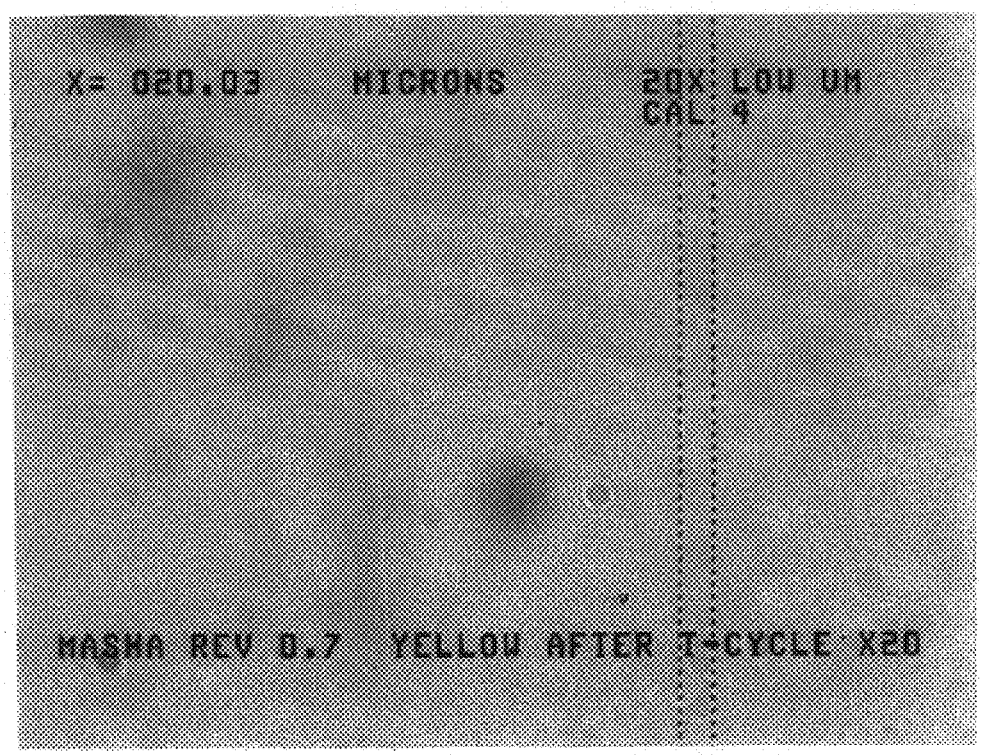

In contrast, Ink Set 0.7, which contains cryoprotective agents, remains substantially stable after thermal cycling. FIGS. 2A and 2B are comparative photographs that show by microscopic examination that there is no increase in the number of large particles in the ink after thermal cycling.

Example 5

Physical Properties of Ink Set 0.7 Before and After Freeze-thaw Testing

Samples of Ink Set 0.7 taken both before and after thermal cycling were tested for viscosity, density, pH, surface tension and particle size counts. Results of the tests are given in the tables below.

Viscosity of Ink Set 0.7, centiPoise, before and after T-cycle

| Ink | Viscosity before | Viscosity after |
|---|---|---|
| Cyan | 2.98 | 3.00 |
| Magenta | 2.86 | 2.81 |
| Yellow | 2.90 | 2.80 |

Density of Ink Set 0.7, centiPoise, before and after T-cycle

| Ink | Density before | Density after |
|---|---|---|
| Cyan | 1.0692 | 1.0677 |
| Magenta | 1.0680 | 1.0672 |
| Yellow | 1.0628 | 1.0626 | pH of Ink Set 0.7 before and after T-cycle

| Ink | pH before | pH after |
|---|---|---|
| Cyan | 8.1 | 8.0 |
| Magenta | 7.0 | 7.1 |
| Yellow | 7.1 | 7.3 |

Surface tension of Ink Set 0.7 before and after T-cycle

| Ink | surface tension before | surface tension after |
|---|---|---|
| Cyan | 30.5 | 30.1 |
| Magenta | 34.6 | 34.7 |
| Yellow | 27.1 | 27.2 |

Particle size count, particles >0.5 μm per ml, of Ink Set 0.7 before and after T-cycle

| Ink | Count before | Count after, top of the vial | Count after, bottom of the vial |
|---|---|---|---|
| Cyan | $8.5 \times 10^5$ | $8.4 \times 10^5$ | $8.9 \times 10^5$ |
| Magenta | $1.0 \times 10^6$ | $1.3 \times 10_6$ | $3.3 \times 10^6$ |
| Yellow | $9.1 \times 10^5$ | $7.0 \times 10^5$ | $6.7 \times 10^5$ |

The results in the tables show that the freeze-thaw cycles do not affect the ink properties significantly. With the particle size, no increase in the count of large particles is seen in cyan and yellow and a small increase is seen in magenta.

Example 6
Effect of Glycerol on Freeze Thaw Stability of Hewlett-Packard Pigmented Black Inks A pigmented black ink ( HP 51645A) printing cartridge was opened and the black inks were collected. Glycerol (3 g) was added to 30 g of the collected inks and the system was mixed. After this, the freeze-thaw test described above was conducted both with the intact black ink and with the ink containing glycerol additive. After the test, the content of the large particles in the ink was measured. The samples were collected from the bottom of the vial, where the concentration of the pigment clumps was expected to be higher. The results are shown in the tables below.

Pigmented black ink as is before T-cycle

| Size cutoff | >0.5 μm | >5 μm | >10 μm | >20 μm |
|---|---|---|---|---|
| Counts/ml | $2 \times 10^9$ | $4 \times 10^5$ | $1 \times 10^5$ | $5 \times 10^3$ |

Pigmented black ink + 10% glycerol before T-cycle

| Size cutoff | >0.5 μm | >5 μm | >10 μm | >20 μm |
|---|---|---|---|---|
| Counts/ml | $5 \times 10^8$ | $6 \times 10^5$ | $1 \times 10^5$ | $1 \times 10^4$ |

Pigmented black ink as is after T-cycle, bottom

| Size cutoff | >0.5 μm | >5 μm | >10 μm | >20 μm |
|---|---|---|---|---|
| Counts/ml | $2 \times 10^9$ | $9 \times 10^6$ | $3 \times 10^6$ | $3 \times 10^5$ |

Pigmented black ink + 10% glycerol after T-cycle, bottom

| Size cutoff | >0.5 μm | >5 μm | >10 μm | >20 μm |
|---|---|---|---|---|
| Counts/ml | $5 \times 10^8$ | $2 \times 10^5$ | $7 \times 10^4$ | $1 \times 10^4$ |

The results in the tables above show that the freeze-thaw cycles considerably increase the number of very large particle aggregates (5–20 mm) by 1–2 orders of magnitude. On the other hand, no such increase is seen in the presence of glycerol.

While the foregoing invention has been described in some detail for purposes of clarity and understanding, it will be clear to one skilled in the art from the reading of this disclosure that various changes in form and detail can be made without departing from the true scope of the invention.

What is claimed is:

1. A method of using at least one additive selected from the group consisting of monosaccharides, polysaccharides, glycerol, β-alanine, DL-alanine, betaine, dimethylsulfoxide, polyvinylpyrrolidone and combinations and derivatives thereof to improve freeze-thaw stability in ink-jet inks comprising adding an amount of the at least one additive to an ink-jet ink composition.

2. The method of claim 1 wherein the amount of cryoprotectant added is from 1 to 30% by weight of the ink-jet ink composition.

3. The method of claim 1 wherein the monosaccharides and polysaccharides are selected from the group consisting of glucose, sucrose, maltose, trehalose, sorbitol and mannitol.

4. The method of claim 1 wherein the ink-jet ink composition comprises at least one of colorant particles, emulsion drops, polymer latexes and vesicles in an aqueous vehicle.

5. The method of claim 1 wherein the amount of cryoprotectant added to the ink-jet ink composition is sufficient so that the composition remains substantially free of visible sediment after at least one freeze-thaw cycle wherein the composition is heated to a high temperature of at highest 70° C. and cooled to a low temperature of at lowest −40° C.

6. The method of claim 5 wherein at most four freeze-thaw cycles are performed on the ink-jet ink composition sample.

7. The method of claim 1 wherein the amount of cryoprotectant added to the ink-jet ink composition is sufficient so that the concentration of particles greater than 0.5 $\mu$m in the composition does not substantially increase after at least one freeze-thaw cycle wherein the composition is heated to a high temperature of at highest 70° C. and cooled to a low temperature of at lowest −40° C.

8. The method of claim 7 wherein at most four freeze-thaw cycles are performed on the ink-jet ink composition sample.

* * * * *